G. DIETE.
BEARING DEVICE.
APPLICATION FILED AUG. 14, 1917.

1,291,438.

Patented Jan. 14, 1919.

Witnesses:
C. E. Wessels
A. A. Olson

Inventor:
Gustave Diete,
By Joshua R. H. Potts
his Attorney

UNITED STATES PATENT OFFICE.

GUSTAVE DIETE, OF CHICAGO, ILLINOIS.

BEARING DEVICE.

1,291,438.  Specification of Letters Patent.  Patented Jan. 14, 1919.

Application filed August 14, 1917. Serial No. 186,124.

*To all whom it may concern:*

Be it known that I, GUSTAVE DIETE, a citizen of the Republic of Brazil, and a resident of the city of Chicago, county of Cook, and State of Illinois, have invented certain new and useful Improvements in Bearing Devices, of which the following is a specification.

My invention relates to improvements in bearing devices designed for use especially in connection with rollers for gravity conveyers, and has for its object the production of a bearing device of the character mentioned which will be of economical construction, and which will permit of ready detachment of the roller or drum when desired. Other objects will appear hereinafter.

The invention consists in the combinations and arrangements of parts hereinafter described and claimed.

Figure 1:
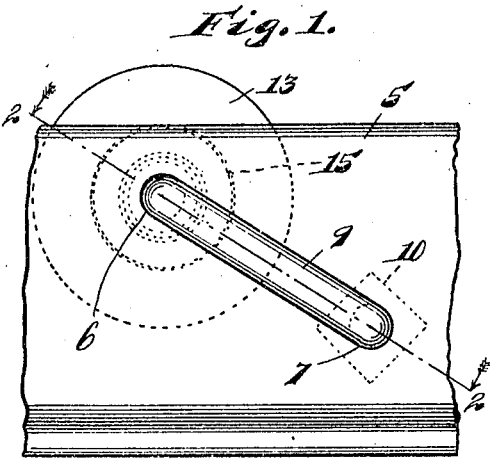
Figure 2:
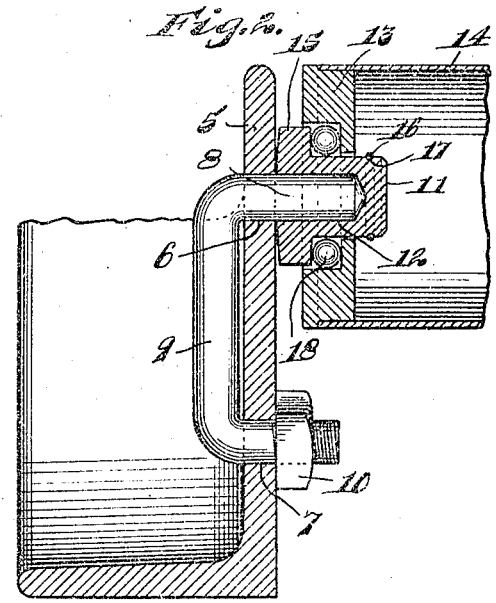

The invention will be best understood by reference to the accompanying drawings forming a part of this specification, and in which, Figure 1 is a fragmental side elevation of a roller and bearing therefor embodying the invention, Fig. 2, a section taken on line 2—2 of Fig. 1.

Figure 4:
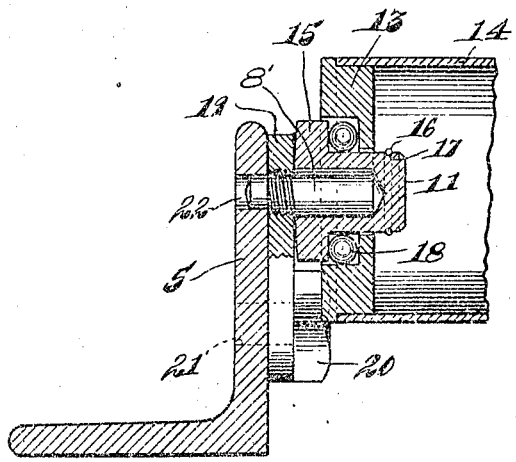
Figure 3:
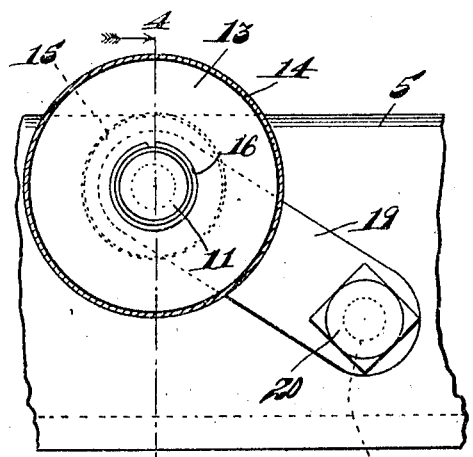

Fig. 3, a section through a roller, in conjunction with which is shown a bearing device of slightly modified form, and Fig. 4, a section taken on line 4—4 of Fig. 3.

The preferred form of construction as illustrated in the drawings comprises a support 5 in the form of an angle iron bracket. Formed in said support are two spaced openings 6 and 7. Through the opening 6 projects loosely a stub shaft 8, the outer end of said stub shaft being carried by and formed integral with a radially projecting shank 9 having its angularly projecting outer end passing through the opening 7. The resulting device thus formed by the parts 8 and 9 is an integral U-shaped member the parallel ends of which are adapted for loose insertion into the openings 6 and 7 as will be readily understood. A nut 10 is threaded on the outer end of shank 9 which serves to lock the shaft 8 together with said shank in position in support 5.

Loosely mounted upon the outer end of stub shaft 8 is a bearing sleeve 11 having a concentric outwardly opening recess 12 for the reception of said shaft. Surrounding said sleeve is an annular bearing member 13 upon which is supported one end of a drum or roller 14 as clearly seen.

The member 13 is held against longitudinal movement in one direction upon a sleeve 11 by means of an outwardly projecting flange 15 formed upon the outer end of said sleeve, longitudinal movement of said member 13 in the opposite direction, upon said sleeve, being limited by a split spring ring 16 adapted to embrace the inner end of said sleeve, the latter being provided with a circumferential groove 17 for engagement by said ring. Interposed between the parts 11 and 13 is a series of balls 18, said parts providing a continuous runway for said balls as will be readily understood.

With the arrangement set forth it will be seen that the stub shaft will be locked in position to support the bearing members 11 and 13 of the roller by means of the nut 10, the arrangement being such that said nut will be radially spaced from the roller so as to not interfere therewith and in a position permitting of ready engagement thereof by a wrench when it is desired to remove the same in order to demount the roller.

In the form shown in Figs. 3 and 4 the stub shaft 8' is carried by a bar or plate 19 the outer end of which is secured by a bolt 20 to the support 5, said support having a tapped opening 21 for engagement by said bolt. In order to positively lock the plate 19 against any rotary movement by the bolt 20 the outer end of stub shaft 8' may be extended slightly as seen for engagement with an opening 22 formed in the support. Except for these differences, the two forms of constructions are the same.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A bearing of the class described comprising inner and outer concentric ball supporting members providing a continuous runway for a series of balls confined therein, said inner ball supporting member having an outwardly opening concentric recess; a shaft loosely engaging with said recess; a support for said shaft; and means spaced radially from said shaft for locking the latter to said support, substantially as described.

2. A bearing of the class described comprising a shaft; a bearing member rotatably mounted on said shaft; a support for said shaft through which said shaft projects; and means spaced radially from said shaft and also projecting through said support for locking the said shaft to said support, substantially as described.

3. A bearing of the class described comprising a shaft; a bearing member rotatably mounted on said shaft; a support for said shaft through which said shaft projects; a radially and angularly projecting member carrying said shaft and also projecting through said support; and means engaging with said radially projecting member for locking said shaft to said support, substantially as described.

4. A bearing of the class described comprising a shaft; a bearing member rotatably mounted on said shaft; a support for said shaft; and a radially projecting angularly formed member carrying said shaft, said support having two spaced openings for engagement by said shaft and member, substantially as described.

5. A bearing of the class described comprising a support having two spaced openings therein; a substantially U-shaped member having its parallel ends passing through said openings; a bearing member rotatably mounted on one end of said U-shaped member; and means engaging with the other end of said U-shaped member for locking the same to said support, substantially as described.

6. A bearing of the class described comprising a shaft; a sleeve loosely mounted on said shaft; an annular bearing member loosely encircling said sleeve; a series of balls interposed between said sleeve and bearing member; and means for holding said bearing member against relative longitudinal movement on said sleeve, said means comprising a split ring embracing said sleeve and against which said bearing member is adapted to abut, substantially as described.

7. A bearing of the class described comprising a shaft; a sleeve loosely mounted on said shaft; an annular bearing member loosely encircling said sleeve; a series of balls interposed between said sleeve and bearing member; and means for holding said bearing member against relative longitudinal movement on said sleeve, said sleeve being circumferentially grooved for the reception of said means, substantially as described.

In testimony whereof I have signed my name to this specification in the presence of two subscribing witnesses.

GUSTAVE DIETE.

Witnesses:
JOSHUA R. H. POTTS,
JANET E. FARRELL.